(12) United States Patent
Jeong et al.

(10) Patent No.: US 9,918,253 B2
(45) Date of Patent: Mar. 13, 2018

(54) METHOD AND APPARATUS FOR PERFORMING COMMUNICATION BY UE IN WIRELESS COMMUNICATION SYSTEM SUPPORTING CIRCUIT SWITCHED FALLBACK SERVICE

(71) Applicant: Samsung Electronics Co., Ltd., Gyeonggi-do (KR)

(72) Inventors: Sang-Soo Jeong, Gyeonggi-do (KR); Hee-Jeong Lee, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 228 days.

(21) Appl. No.: 14/397,446

(22) PCT Filed: Apr. 26, 2013

(86) PCT No.: PCT/KR2013/003645
§ 371 (c)(1),
(2) Date: Oct. 27, 2014

(87) PCT Pub. No.: WO2013/162331
PCT Pub. Date: Oct. 31, 2013

(65) Prior Publication Data
US 2015/0087308 A1    Mar. 26, 2015

(30) Foreign Application Priority Data

Apr. 26, 2012  (KR) .......................... 10-2012-0044174
Apr. 19, 2013  (KR) .......................... 10-2013-0043840

(51) Int. Cl.
*H04W 36/00*        (2009.01)

(52) U.S. Cl.
CPC .... *H04W 36/0022* (2013.01); *H04W 36/0083* (2013.01)

(58) Field of Classification Search
CPC ...................................................... H04W 36/00
See application file for complete search history.

(56) References Cited

U.S. PATENT DOCUMENTS

| 2005/0073977 | A1  | 4/2005 | Vanghi et al. |
| 2008/0219212 | A1  | 9/2008 | Kim |
| 2009/0042601 | A1* | 2/2009 | Wang ................ H04W 36/0088 455/553.1 |

(Continued)

OTHER PUBLICATIONS

International Search Report dated Jul. 30, 2013 in connection with International Patent Application No. PCT/KR2013/003645, 3 pages.

(Continued)

*Primary Examiner* — Mazda Sabouri

(57) ABSTRACT

Provided is a User Equipment (UE) in a wireless communication system supporting a Circuit Switched FallBack (CSFB) service. The UE includes a transceiver for transmitting and receiving a signal to/from a first or second communication system that uses a different frequency; a receiver for receiving a signal from the second communication system; and a controller for controlling an operation of receiving signaling information for the CSFB service from the first communication system through the transceiver, and simultaneously measuring channel status of the second communication system using the signal received from the receiver.

16 Claims, 7 Drawing Sheets

(56) References Cited

U.S. PATENT DOCUMENTS

| | | | |
|---|---|---|---|
| 2010/0317347 A1 | 12/2010 | Burbidge et al. | |
| 2011/0014919 A1* | 1/2011 | Otte | H04W 36/0061 |
| | | | 455/442 |
| 2011/0103277 A1 | 5/2011 | Watfa et al. | |
| 2012/0040675 A1 | 2/2012 | Otte et al. | |
| 2012/0064884 A1 | 3/2012 | Ramachandran et al. | |
| 2013/0130678 A1* | 5/2013 | Zanier | H04W 8/065 |
| | | | 455/433 |
| 2013/0189991 A1* | 7/2013 | Rose | H04W 16/18 |
| | | | 455/436 |
| 2013/0210444 A1* | 8/2013 | Morrin | H04W 48/06 |
| | | | 455/445 |
| 2013/0301466 A1* | 11/2013 | Nenner | H04W 36/0022 |
| | | | 370/252 |

OTHER PUBLICATIONS

Written Opinion of the International Searching Authority dated Jul. 30, 2013 in connection with International Patent Application No. PCT/KR2013/003645, 6 pages.

Extended Search Report dated Feb. 1, 2016 in connection with European Patent Application No. 13781015.6, 8 pages.

* cited by examiner

[Fig. 1]
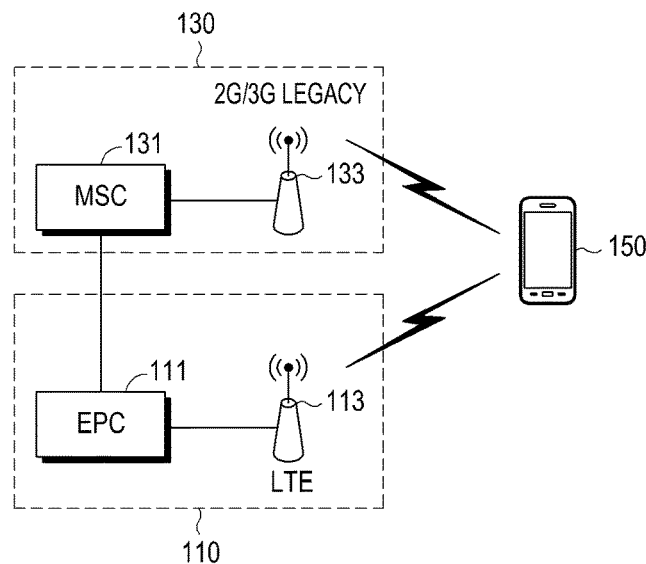
[Fig. 2]
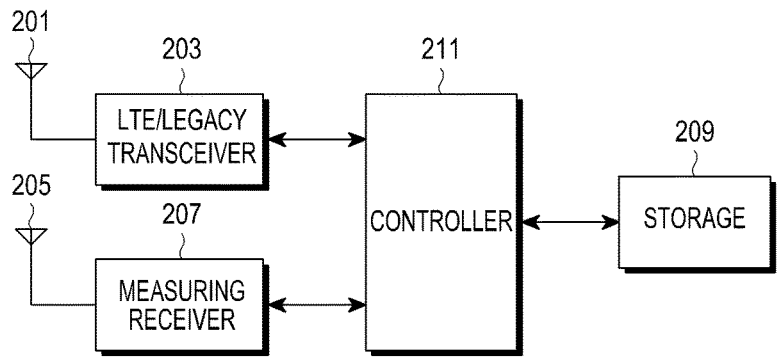
[Fig. 3]
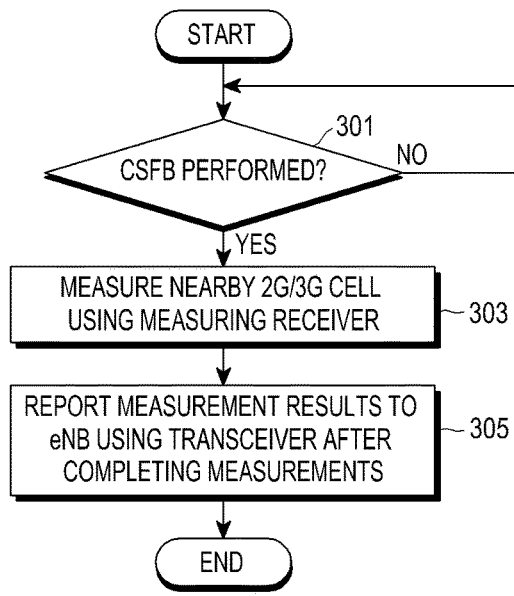

[Fig. 4]
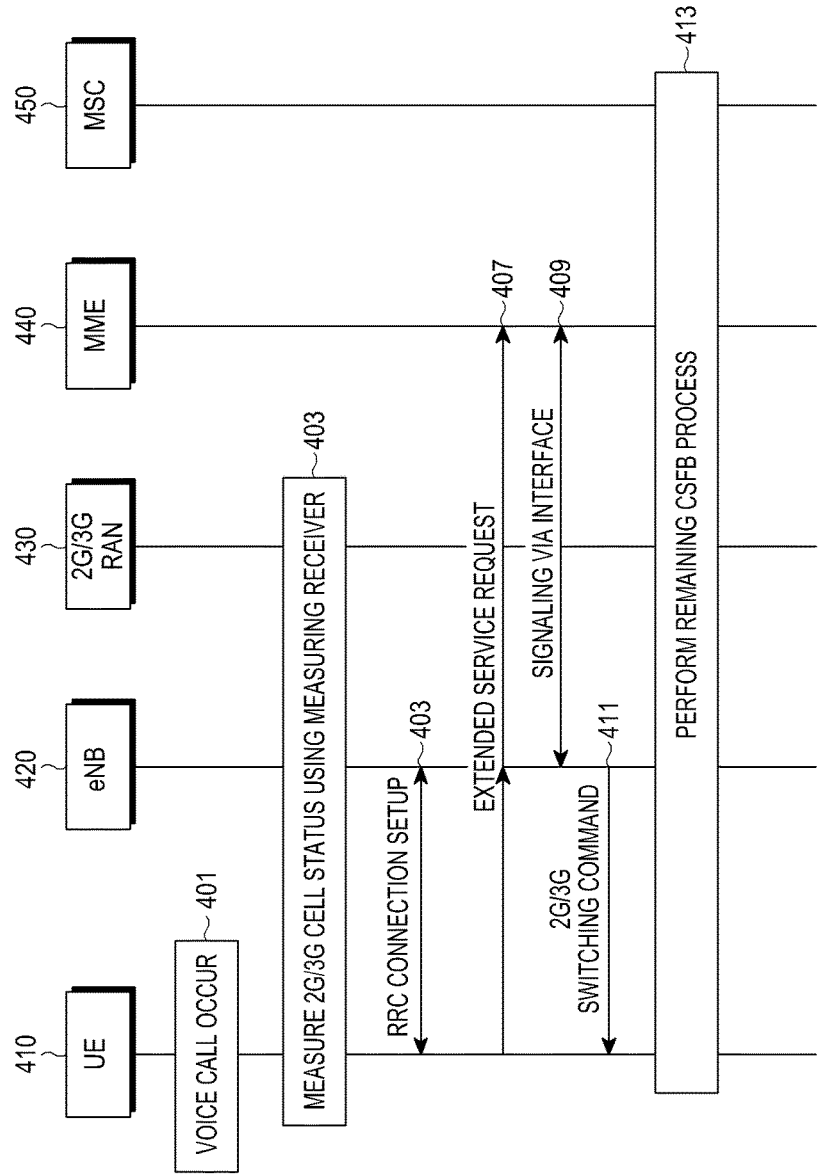
[Fig. 5]
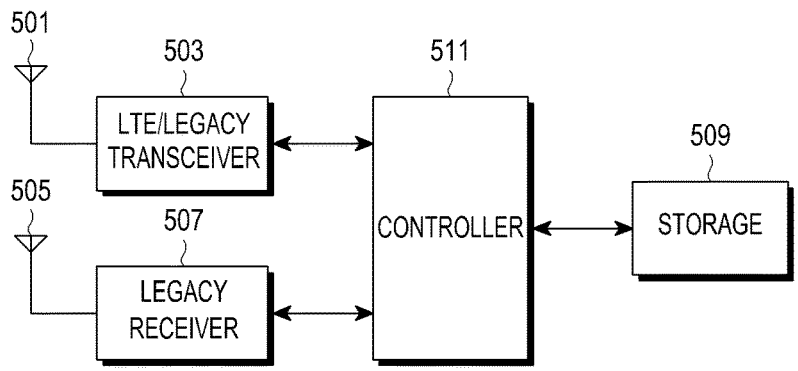

[Fig. 6]
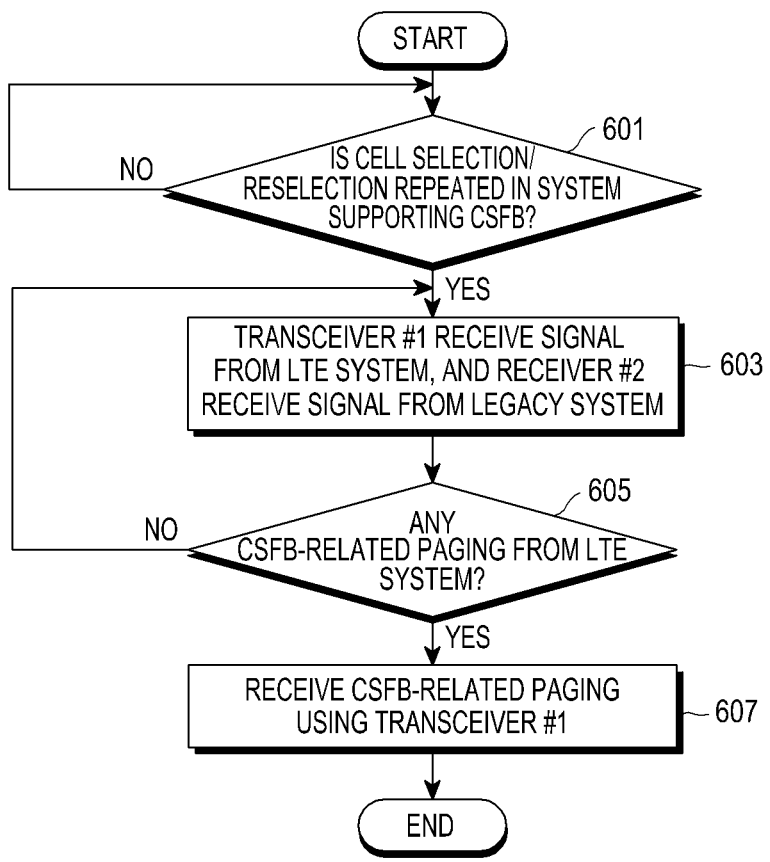

[Fig. 7]
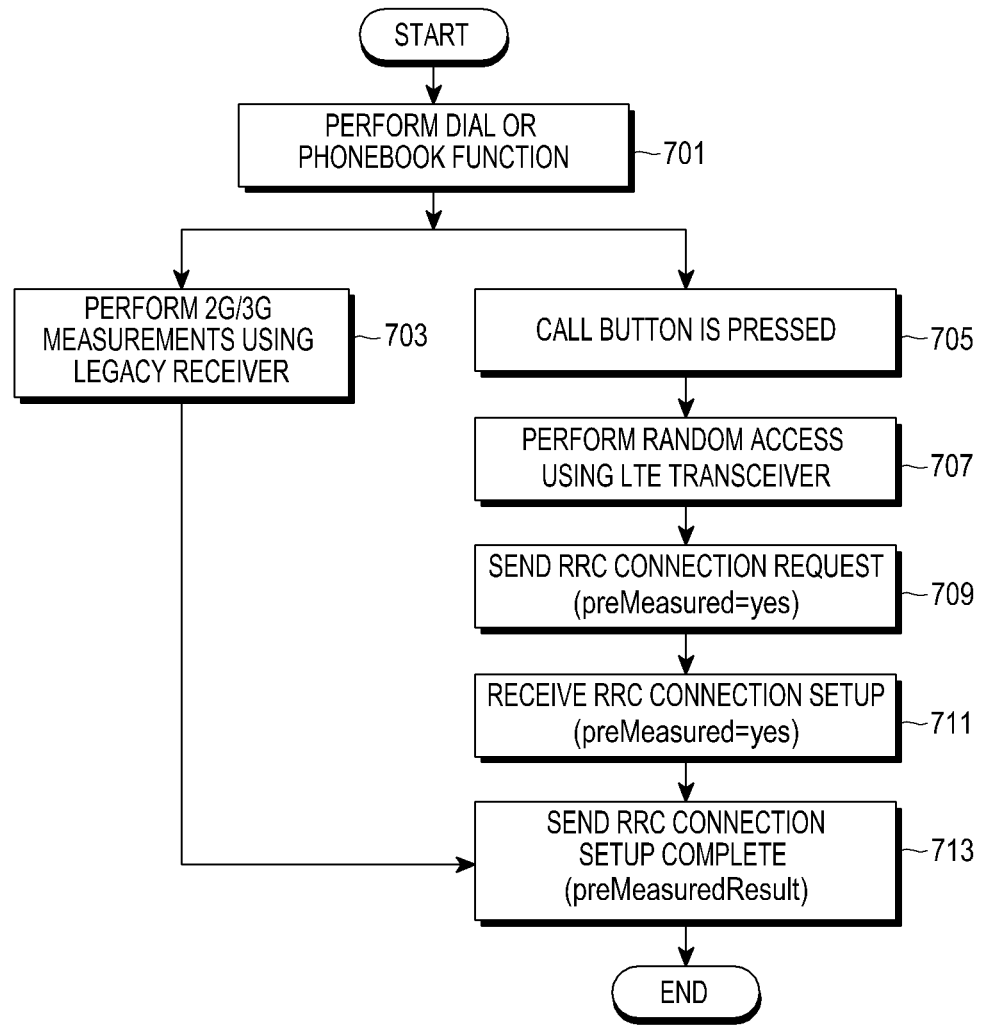

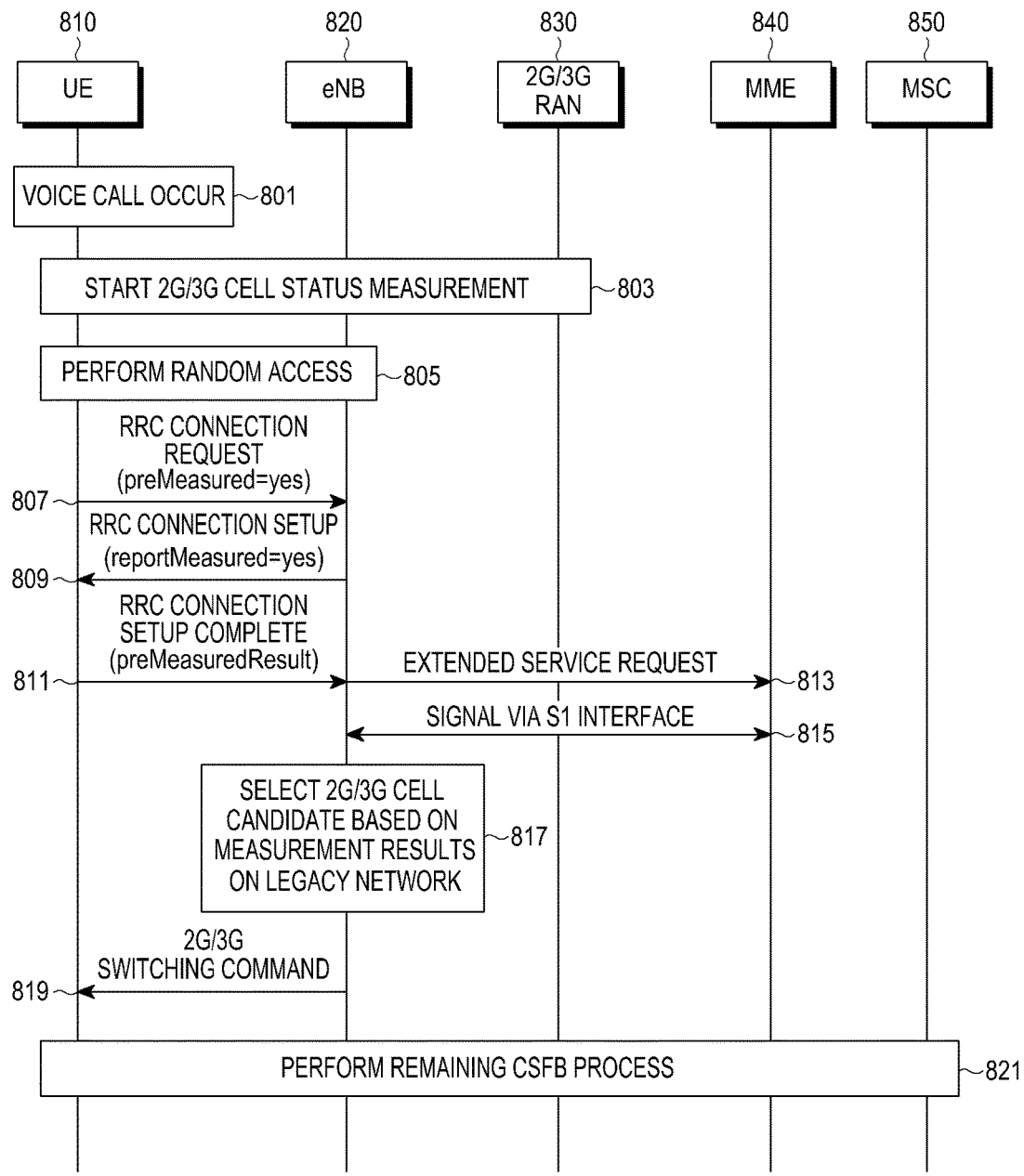
[Fig. 8]

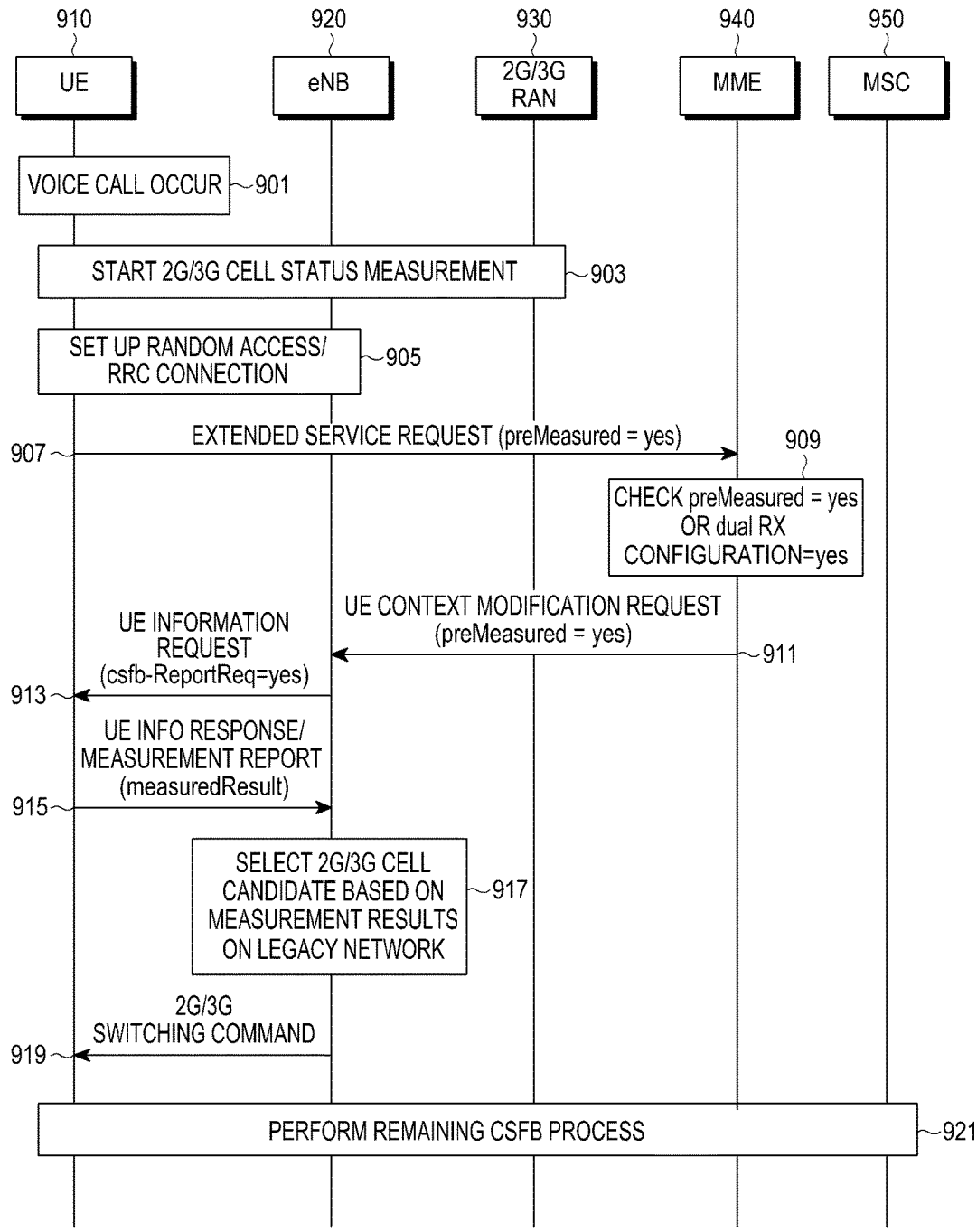

[Fig. 10]
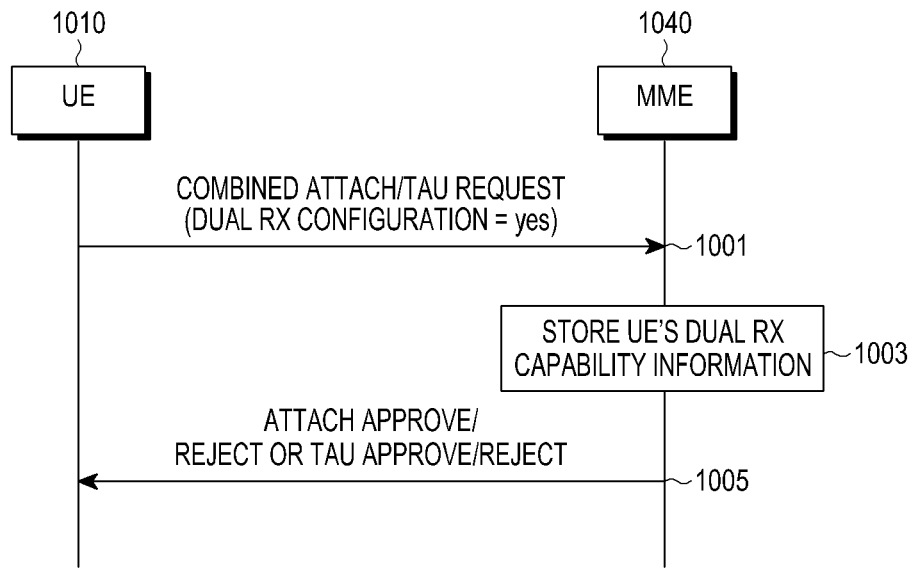
[Fig. 11]
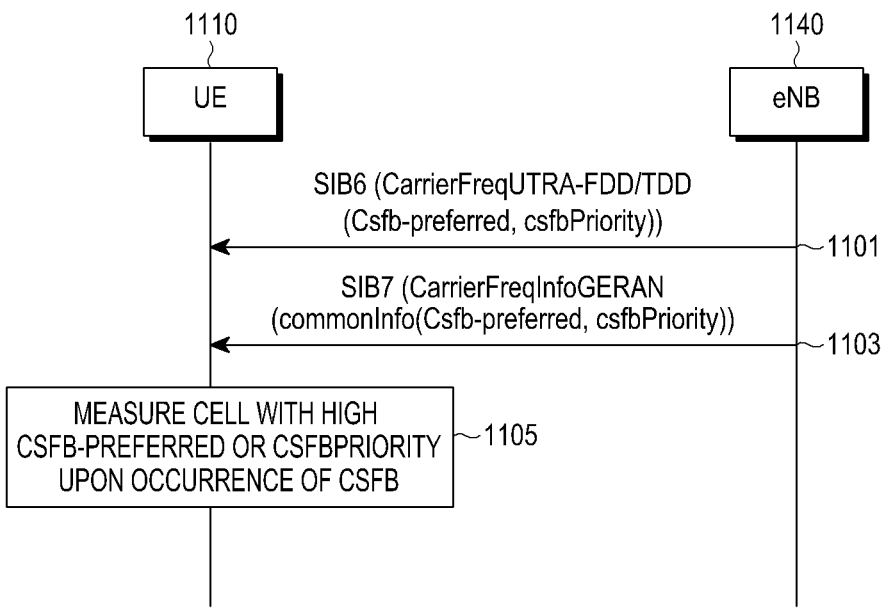

METHOD AND APPARATUS FOR PERFORMING COMMUNICATION BY UE IN WIRELESS COMMUNICATION SYSTEM SUPPORTING CIRCUIT SWITCHED FALLBACK SERVICE

CROSS-REFERENCE TO RELATED APPLICATIONS AND CLAIM OF PRIORITY

The present application claims priority under 35 U.S.C. § 365 to International Patent Application No. PCT/KR2013/003645 filed Apr. 26, 2013, entitled "METHOD AND APPARATUS FOR PERFORMING COMMUNICATION BY UE IN WIRELESS COMMUNICATION SYSTEM SUPPORTING CIRCUIT SWITCHED FALLBACK SERVICE". International Patent Application No. PCT/KR2013/003645 claims priority under 35 U.S.C. § 365 and/or 35 U.S.C. § 119(a) to Korean Patent Application No. 10-2012-0044174 filed Apr. 26, 2012 and Korean Patent Application No. 10-2013-0043840 filed Apr. 19, 2013 and which are incorporated herein by reference into the present disclosure as if fully set forth herein.

TECHNICAL FIELD

The present invention relates generally to technology for setting up voice calls in a Long Term Evolution (LTE) system, and more particularly, to a communication method and apparatus for reducing the time required for setting up voice calls when Circuit Switched FallBack (CSFB) is used.

BACKGROUND

So far, the second-generation (2G) system and the third-generation (3G) system have been mainly used, and in recent years, standardization of Long Term Evolution (LTE), which is the fourth-generation (4G) system, is under way.

Since the LTE system basically supports only the packet services, the LTE standard has proposed a so-called Circuit Switched FallBack (CSFB) service to provide voice services to users of the LTE system.

FIG. 1 schematically illustrates a configuration of a wireless communication system supporting a CSFB function.

Referring to FIG. 1, an LTE system 110 includes an Evolved Packet Core (EPC) 111 and an evolved Node B (eNB) 113. Although not illustrated, the EPC 111 includes a Mobility Management Entity (MME) responsible for a control plane, and a Serving GateWay (S-GW) and a PDN GateWay (P-GW) responsible for a user plane. A 2G/3G legacy system 130 includes a Mobile Switching Center (MSC) 131 responsible for call switching processing, and a Base Station (BS) 133.

The CSFB service refers to a service, in which if a voice call occurs to a User Equipment (UE) 150 which is capping on the LTE system 110, the UE 150 is handed over to the existing 2G/3G legacy system 130 to connect the voice call.

During the CSFB process, the UE 150 is handed over from the LTE system 110 to the 2G/3G legacy system 130. At this point, in order to select an appropriate cell (for example, a cell with a good channel status) from among the undepicted 2G/3G cells around the UE 150 and switch the UE 150 to the selected cell, the LTE system 110 may receive measurement reports on the 2G/3G cells from the UE 150.

However, compared to when setting up a voice call directly in the existing 2G/3G legacy system, if it uses CSFB, the UE 150 additionally needs the time required for switching from the LTE system to the 2G/3G legacy system and measuring the cell status, causing delays that degrade the Quality of Service (QoS) in the CSFB service.

The above information is presented as background information only to assist with an understanding of the present disclosure. No determination has been made, and no assertion is made, as to whether any of the above might be applicable as prior art with regard to the present invention.

SUMMARY

An aspect of the present invention is to address at least the above-mentioned problems and/or disadvantages and to provide at least the advantages described below. Accordingly, an aspect of the present invention is to provide a method and apparatus for performing communication by a UE to reduce the delays in a wireless communication system supporting CSFB.

Another aspect of the present invention is to provide a method and apparatus for performing communication by a UE to stably receive a paging message in a wireless communication system supporting CSFB.

In accordance with an aspect of the present invention, there is provided a User Equipment (UE) in a wireless communication system supporting a Circuit Switched FallBack (CSFB) service. The UE includes a transceiver for transmitting and receiving a signal to/from a first or second communication system that uses a different frequency; a receiver for receiving a signal from the second communication system; and a controller for controlling an operation of receiving signaling information for the CSFB service from the first communication system through the transceiver, and simultaneously measuring channel status of the second communication system using the signal received from the receiver.

In accordance with another aspect of the present invention, there is provided a method for performing communication by a User Equipment (UE) that uses a Circuit Switched FallBack (CSFB) service if a voice call of a second communication system occurs in a first communication system providing a data service. The method includes, if the voice call occurs, starting measurements on channel status of the second communication system using a receiver for receiving a signal from the second communication system; and sending and receiving messages for the CSFB service to/from an evolved Node B (eNB) of the first communication system using a transceiver for communication with the first communication system, while performing the measurements on channel status.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 1 schematically illustrates a configuration of a wireless communication system supporting a CSFB function;

FIG. 2 is a block diagram illustrating a structure of a UE according to an exemplary embodiment of the present invention;

FIG. 3 is a flowchart illustrating a method for performing communication by a UE that uses a CSFB service, according to an exemplary embodiment of the present invention;

FIG. 4 is a flow diagram illustrating a communication method in a wireless communication system supporting CSFB according to an exemplary embodiment of the present invention;

FIG. 5 is a block diagram illustrating a structure of a UE according to another exemplary embodiment of the present invention;

FIG. 6 is a flowchart illustrating a method for performing communication by a UE that uses a CSFB service, according to another exemplary embodiment of the present invention;

FIG. 7 is a flowchart illustrating a UE's operation of performing measurements on a legacy network according to another exemplary embodiment of the present invention;

FIG. 8 is a flow diagram illustrating a communication method in a wireless communication system supporting CSFB according to another exemplary embodiment of the present invention;

FIG. 9 is a flow diagram illustrating a communication method in a wireless communication system supporting CSFB according to further another exemplary embodiment of the present invention;

FIG. 10 is a flow diagram illustrating a procedure for sending a NAS message including Dual RX configuration information according to further another exemplary embodiment of the present invention; and FIG. 11 is a flow diagram illustrating a procedure for providing information about cells for a CSFB service as system information by an eNB according to an exemplary embodiment of the present invention.

Throughout the drawings, like reference numerals will be understood to refer to like parts, components, and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although exemplary embodiments of the present invention will be described in detail below mainly for the Third Generation Partnership Project (3GPP) Long Term Evolution (LTE) system, it will be apparent to those of ordinary skill in the art that the embodiments may be applied to any other communication/computer systems having the similar technical backgrounds and system configurations with a slight modification, without departing from the spirit and scope of the invention.

The present invention is technology for reducing the time required for setting up a voice call in a communication environment where an LTE system uses CSFB to provide a voice service to a UE.

More specifically, if a user of the LTE system presses a Call button of a UE, or if a Mobile Terminating (MT) voice call occurs to the user of the LTE system, the UE switches to the 2G/3G legacy system through the CSFB process, and then sets up a voice call. In order to prevent the failure to set up a voice call, the UE needs to select an appropriate cell (for example, a cell with a good channel status, i.e., a cell whose signal strength is greater than or equal to a predetermined reference value or whose channel status satisfies predetermined conditions) from among the 2G/3G cells around the UE, and to be switched to the selected 2G/3G cell.

To this end, the LTE system may instruct the UE to perform measurement reports on the 2G/3G cells. Generally, a UE may receive signals transmitted from one system, at a time. Therefore, in order to measure the channel status of the 2G/3G cells, the UE needs to switch from the LTE system to the 2G/3G cell of the 2G/3G legacy system during a predetermined measurement period. However, since performing signaling for CSFB in the LTE system and measuring the channel status of the 2G/3G cells may not be simultaneously carried out, delays may occur in performing signaling for CSFB and measuring the channel status of the 2G/3G cells, which may reduce the Quality of Service (QoS) of the CSFB service and increase the power consumption of the UE.

Exemplary embodiments of the present invention propose ways to perform measurements for selecting a 2G/3G cell while performing signaling required for the CSFB process in the LTE system.

FIG. 2 is a block diagram illustrating a structure of a UE according to an exemplary embodiment of the present invention.

Referring to FIG. 2, a UE includes an LTE/legacy transceiver (hereinafter referred to as a 'transceiver' for short) 203 for transmitting and receiving signals to/from the LTE system or 2G/3G legacy system (not shown) via an antenna 201 in accordance with its associated predetermined communication scheme, and a measuring receiver 207 for receiving measurement signals from 2G/3G cells of the 2G/3G legacy system via an antenna 205. The UE may also include a storage 209 for storing information about the cell on which it has camped, or the cells, the channel status of which it will measure.

A controller 211 controls and manages the overall operation of (for example, voice calls, data calls, and application operations) of the UE. In the CSFB service, the controller 211 controls UE's operation for the use of the CSFB service by sending a related request to the system or handling a command message received from the system.

As one of its basic control operations, the UE may receive information about the cell on which it has camped, or the cells, the channel status of which it will measure, through the transceiver 203, and store the received information in the storage 209. If the CSFB process is needed, the controller 211 controls an operation of performing measurement on the 2G/3G cells of the 2G/3G legacy system by means of the measuring receiver 207 in parallel (or simultaneously) while performing signaling for CSFB with the LTE system by means of the transceiver 203.

FIG. 3 is a flowchart illustrating a method for performing communication by a UE that uses a CSFB service, according to an exemplary embodiment of the present invention.

Referring to FIG. 3, in step 301, the UE initiates an operation of using the CSFB service as its user initiates an outgoing call, in the case of a Mobile Originating (MO) call, and the UE initiates an operation of using the CSFB service as it receives a paging or CS paging notification message from the LTE system, in the case of Mobile Terminating (MT) call. For the known initiation process of the CSFB service, reference may be made to 3GPP TS 23.272.

If CSFB is initiated in step 301, the UE starts measuring the channel status of its nearby 2G/3G cells using the measuring receiver 207 in step 303. The UE may create its Radio Resource Control (RRC) connection to an evolved Node B (eNB) of the LTE system, and start the measurements on its nearby 2G/3G cells upon receiving a measurement command from the eNB. Since the measuring receiver 207 may operate independently of the transceiver 203 under control of the controller 211, the UE may simultaneously perform signaling (for example, RRC connection creation, extended service request transfer, Packet Switched Hand Over (PS HO)/cell change order/RRC connection release) to the LTE system for the CSFB process, while measuring the channel status of the 2G/3G cells. In step 305, if its measurements on the nearby 2G/3G cells are completed, the UE reports the measurement results on the nearby 2G/3G cells, which are obtained by the measuring receiver 207, to the eNB of the LTE system using the transceiver 203. Although not illustrated in FIG. 3, the operation of reporting to the eNB by the UE may be performed together with some of the CSFB process.

FIG. 4 is a flow diagram illustrating a communication method in a wireless communication system supporting CSFB according to an exemplary embodiment of the present invention.

Referring to FIG. 4, in step 401, a voice call occurs as a user initiates an outgoing call, in the case of an MO call, and a voice call occurs as a UE 410 receives a paging or CS paging notification message from the LTE system, in the case of an MT call. As the voice call occurs, a CSFB process is initiated. For the detailed CSFB initiation process, reference may be made to 3GPP TS 23.272.

As the CSFB process is initiated, upon detecting a need for CSFB, the UE 410 measures 2G/3G cell status in a 2G/3G Radio Access Network (RAN) 430 using the measuring receiver 207 in step 403. The 2G/3G cell status measurements may be performed if the UE 410 detects the need for CSFB, or may be performed at stated intervals. The UE 410 may perform the 2G/3G cell status measurements as soon as the CSFB process starts, like in the example of FIG. 4. Although not illustrated, if an eNB 420 sends a measurement command to the UE 410 through RRC connection, the UE 410 may start the 2G/3G cell status measurements by receiving the measurement command.

If the 2G/3G cell status measurements are completed, the UE 410 reports the measurement results to the eNB 420 using the RRC connection. If the UE 410 is in an idle state, the UE 410 sets up an RRC connection to the eNB 420 in step 405, before reporting the measurement results. Therefore, step 405 is optional.

Thereafter, in step 407, the UE 410 sends an extended service request to an MME 440 that controls the UE mobility in the LTE system and is responsible for the UE's control plane, in order to request the CSFB process. The extended service request is forwarded to the MME 440 via the eNB 420.

The UE 410 may simultaneously perform the RRC and Non Access Stratum (NAS) signaling and the 2G/3G cell status measurements using the transceiver 203. Upon receiving the extended service request, the MME 440 signals (or sends) to the eNB 420 a command to fall back the UE 410 to the 2G/3G legacy system, by using, for example, an S1 interface, in step 409. In step 411, upon receiving the command, the eNB 420 selects a 2G/3G cell (or a list of cells) that the UE 410 will actually use, and sends, to the UE 410, a 2G/3G switching command (for example, PS HO command, cell change order, RRC connection release, or the like). When selecting a 2G/3G cell, the eNB 420 uses the cell status information that the UE 410 measured and reported in step 403. Thereafter, in step 413, the known remaining procedure is performed to provide the CSFB service to the UE 410.

Another exemplary embodiment of the present invention, which is proposed to prevent the failure to receive a paging message transmitted from the LTE system using CSFB, will be described in detail below.

Specifically, it will be assumed that when two or more communication services (for example, a communication service of the LTE system and a communication service of the 2G/3G legacy system) are provided at different frequencies, a UE frequently repeats cell selection/reselection (the so-called ping-pong phenomenon) as it is located in the cell boundary, or due to the cell policy. In this case, a UE capable of using the two or more communication services may not stably receive a paging message transmitted from its associated system, using any one frequency.

For example, if a UE is considered that can use communication services which are provided from the LTE system supporting the CSFB service and the 2G/3G legacy system using different frequencies, a paging message (for example, a paging message for informing the UE of the start of the CSFB) indicating that a voice call occurs from the 2G/3G legacy system, to provide the CSFB service in the LTE system, is sent to the UE through the LTE system, and is not sent to the UE through the 2G/3G legacy system. In this case, if the UE has been camping on a cell of the 2G/3G legacy system, the UE may not stably receive the paging message that is sent to the UE through the LTE system, which causes an increase in call failure rate in the wireless communication system.

Therefore, another exemplary embodiment of the present invention provides a communication apparatus and method for a UE, which includes a transceiver that can receive signals from the LTE system and/or the 2G/3G legacy system to make it possible to stably receive the paging message even in the above cases, and also includes a separate legacy receiver capable of receiving signals from the 2G/3G legacy system.

FIG. 5 is a block diagram illustrating a structure of a UE according to another exemplary embodiment of the present invention.

Referring to FIG. 5, a UE includes antennas 501 and 505, an LTE/legacy transceiver 503, a legacy receiver 507, a storage 509, and a controller 511. The components of the UE in FIG. 5 may be the same as the corresponding components of the UE in FIG. 2 in terms of the operation. Therefore, a description of the same components will be omitted, when they perform the same operation as the components of the UE in FIG. 2.

In accordance with the UE structure of FIG. 5, the UE receives signals from the 2G/3G legacy system through the legacy receiver 507 even if the UE camps on a cell of the 2G/3G legacy system. Therefore, the UE may stably receive, through the LTE/legacy transceiver 503, a paging message that is sent to the UE through the LTE system for the CSFB service, thereby making it possible to increase the call success rate of the UE when the ping-pong phenomenon occurs.

The legacy receiver 507 may be implemented to include the function of the measuring receiver 207 in FIG. 2. In an alternative embodiment, the legacy receiver 507 may be implemented to exclude the function of the measuring receiver 207.

FIG. 6 is a flowchart illustrating a method for performing communication by a UE that uses a CSFB service, according to another exemplary embodiment of the present invention.

Referring to FIG. 6, the UE determines in step 601 whether the ping-pong phenomenon occurs in which cell selection/reselection is frequently repeated in the wireless communication system supporting CSFB. Whether the ping-pong phenomenon occurs may be determined using the known technology, so a detailed description thereof will be omitted.

If the ping-pong phenomenon occurs, the UE controls its reception operation of receiving signals from the LTE system through a first transceiver (for example, the LTE/legacy transceiver 503) and receiving signals from the 2G/3G legacy system through a second receiver (for example, the legacy receiver 507), in step 603. Thereafter, the UE determines in step 605 whether a CSFB-related paging message is sent from the LTE system. If so, the UE receives the CSFB-related paging message through the first transceiver and performs the subsequent operation for the CSFB service, in step 607.

Although the embodiment in FIG. 6 is an example of the operation of the UE with the structure of FIG. 5, it is to be noted that the operation of the UE in FIG. 5 is not limited to the communication method in FIG. 6.

Next, a description will be made as to when the UE will start measurements on the 2G/3G cells using the legacy receiver 507, when the measurement method proposed by another exemplary embodiment of the present invention, i.e., the UE structure of FIG. 5 uses a method of reducing the delay time occurring in the CSFB service with the use of the LTE/legacy transceiver 503 and the legacy receiver 507.

Generally, a user of a UE executes a dial or phonebook function to make a phone call. For example, if the UE is a smart phone, the time at which measurements on the 2G/3G cells is started may be detected, as a dial/phonebook application is executed. If the UE is a feature phone, the time at which measurements on the 2G/3G cells is started may be detected, as a dial/phonebook button is pressed. While these operations are executed, the user may consume time to enter a phone number or to search for a call recipient. During this time, the UE may perform measurements on the legacy network.

FIG. 7 is a flowchart illustrating a UE's operation of performing measurements on a legacy network according to another exemplary embodiment of the present invention. The operation in FIG. 7 will be described with reference to FIG. 5.

Referring to FIG. 7, if the controller 511 determines in step 701 that a user makes an outgoing call by executing a dial or phonebook function, the controller 511 immediately starts measurements on the legacy network using the legacy receiver 507 in step 703. If a recipient's phone number is entered/selected and then a Call button is pressed in step 705, the controller 511 performs random access to the LTE network as an introduction process for the CSFB service using the LTE/legacy transceiver 503 in step 707. In an exemplary embodiment of the present invention, since the legacy receiver 507 and the LTE/legacy transceiver 503 are separated, the UE may simultaneously perform the measurement on the legacy network and the CSFB introduction process.

Thereafter, in step 709, the UE sends an RRC connection request message including information (for example, preMeasured flag) indicating that the measurements on the legacy network is underway, to the eNB of the LTE system. If the eNB supports the CSFB function, the UE receives from the eNB an RRC connection setup message including information (for example, reportedMearured flag) for instructing to report measurement results to the eNB, in step 711. In step 713, upon receiving the RRC connection setup message, the UE sends an RRC connection setup complete message including the measurement results (for example, preMeasuredResult IE) to the eNB. Upon receiving the measurement results, the eNB of the LTE system may determine the target cell for CSFB without the separate measurement and reporting process, using the received measurement results.

In accordance with an exemplary embodiment in FIG. 7, if a voice call occurs, the UE may start in advance the measurements on the legacy network by means of the separate legacy receiver, and may report the measurement results on the legacy network to the eNB and the MME through an RRC connection procedure, thus making it possible to significantly reduce the time delay compared to the method of executing measurements on the legacy network after receiving a measurement command for the legacy network from the eNB that has performed the RRC connection procedure in the CSFB service.

FIG. 8 is a flow diagram illustrating a communication method in a wireless communication system supporting CSFB according to another exemplary embodiment of the present invention.

Referring to FIG. 8, in step 801, a voice call occurs as a user initiates an outgoing call, in the case of an MO call, and a voice call occurs as a UE receives a paging or CS paging notification message from the LTE system, in the case of an MT call. As the voice call occurs, a CSFB process is initiated. The user initiates an outgoing call by executing a dial or phonebook function for the outgoing call. If the voice call occurs, a UE 810 starts measurements on the 2G/3G cell status in a 2G/3G RAN 830, which is a legacy network, using its legacy receiver 507, in step 803.

In step 805, the UE 810 performs a random access to the LTE network using its LTE/legacy transceiver 503. Therefore, the UE 810 may simultaneously perform the measurements on the legacy network and the CSFB introduction process.

In step 807, the UE 810 sends an RRC connection request message including information (for example, preMeasured=yes) indicating that the measurements on the legacy network is underway by step 803, to an eNB 820 of the LTE system. If the eNB 820 supports the CSFB function, the UE 810 receives an RRC connection setup message including information (for example, reportedMearured=yes) for instructing to report the measurement results, from the eNB 820 in step 809. The preMeasured and the reportedMearured are flag information, and each of them indicates 'yes' if its value is, for example, '1', and 'no' if its value is, for example, '0'. In step 811, the UE 810 sends to the eNB 820 an RRC connection setup complete message including the measurement results (for example, preMeasuredResult) obtained in step 803. In step 813, the eNB 820 sends an extended service request including the measurement results (for example, preMeasuredResult) on the legacy network to an MME 840 to request a CSFB process.

In step 815, upon receiving the extended service request, the MME 840 signals (or sends) a command to fall back the UE 810 to the 2G/3G legacy system, to the eNB 820 by using, for example, an S1 interface. In step 817, the eNB 820 selects a 2G/3G cell (or a list of cells) to be used by the UE 810, based on the measurement results (for example, preMeasuredResult) on the legacy network. In step 819, the eNB 820 sends to the UE 810 a 2G/3G switching command (for example, PS HO command, cell change order, RRC connection release, or the like) to switch to the selected 2G/3G cell. Thereafter, in step 821, the known remaining procedure for providing the CSFB service to the UE 810 is performed.

FIG. 9 is a flow diagram illustrating a communication method in a wireless communication system supporting CSFB according to further another exemplary embodiment of the present invention. Although the embodiment in FIG. 9 is the same as the embodiment in FIG. 8 in starting the measurements on the legacy network in advance, the embodiment in FIG. 9 separately reports the measurement results on the legacy network using the extended service request. Contrary to the embodiment in FIG. 8, the embodiment in FIG. 9 may be performed even in a UE in a connected mode.

Referring to FIG. 9, steps 901 and 903, in which a voice call occurs and the measurements on the 2G/3G cell status is started in advance, are the same as steps 801 and 803 in FIG. 8, in terms of the operation. In step 905, a UE 910 performs the existing operation for Random Access (RA)/RCC connection setup. In step 907, the UE 910 sends an extended service request including information (for example, preMeasured=yes) indicating that the measurement on the legacy network is underway, to an eNB 920 of the LTE system, and the eNB 920 forwards the extended service request to an MME 940.

In step 909, the MME 940 may check from the extended service request the information (for example, preMeasured=yes) indicating that the UE 910 is performing the measurement on the legacy network, or may determine that the UE 910 starts the measurement on the legacy network in advance, by receiving from the UE as in FIG. 10 a Non-Access Stratum (NAS) message including information (for example, Dual RX Configuration=yes) indicating that the UE 910 may perform the measurements in advance, as it has two receivers like, for example, the structure in FIG. 5.

FIG. 10 is a flow diagram illustrating a procedure for sending a NAS message including Dual RX configuration information according to further another exemplary embodiment of the present invention. The procedure in FIG. 10 may be performed in a UE that includes two receivers (an LTE/legacy transceiver and a legacy receiver) like in the UE structure in FIG. 5.

Referring to FIG. 10, a UE 1010 sends a NAS message including the Dual RX configuration information (for example, Dual RX Configuration=yes) to an MME 1040 in step 1001. An Attach message or a Tracking Area Update (TAU) request message used in the LTE system may be used as the NAS message. In step 1003, upon receiving the NAS message, the MME 1040 stores the Dual RX configuration information (that is, capability information), and may recognize that the UE 1010 has two receivers and starts in advance the measurements on the legacy network in the CSFB service. In step 1005, the MME 1040 sends an Attach Approve/Reject message or a UAU Approve/Reject message to the UE 1010 in response to the Attach message or TAU request message.

Turning back to FIG. 9, having recognized that the UE 910 starts the measurement on the legacy network in advance, the MME 940 sends a UE Context Modification Request message including information (for example, preMeasured=yes) indicating that the measurement on the legacy network is underway, to the eNB 920 to start the CSFB service, in step 911.

In step 913, upon receiving the UE Context Modification Request message, the eNB 920 sends, to the UE 910, a UE Information Request message including a command (for example, csfb-ReportReq=yes) to report the measurement results on the legacy network for the CSFB service instead of setting for the measurement process.

In step 915, the UE 910 sends an RRC message (for example, UEInformationResponse or MeasurementReport) including the measurement results (measuredResult) on the legacy network, to the eNB 920 to report its measurement results. Thereafter, in step 917, the eNB 920 selects a 2G/3G cell candidate for the CSFB service based on the measurement results on the legacy network. Steps 919 and 921, in which the eNB 920 sends a 2G/3G switching command and the known remaining procedure for providing the CSFB service is performed, are the same as steps 819 and 821 in FIG. 8, in terms of the operation.

Next, a description will be made of a method for determining which of the nearby legacy cells (2G GERAN cell and 3G UTRAN cell) a UE will measure first, when the UE initiates measurements on the legacy network for the CSFB service in an exemplary embodiment of the present invention. If the time required for the measurements on the legacy network is long in the CSFB process, the Quality of Experience (QoE) is very low. Therefore, if there are multiple nearby legacy cells, the UE may first measure only the cells that can be used for CSFB. The existing CSFB service has no problem, since an eNB selects a target measurement cell to be appropriate for CSFB after it receives a CSFB request and CSFB is started by the MME, and then informs a UE of the selected cell. However, in the case where a UE performs a measurement process on a legacy cell in advance like in the exemplary embodiment of the present invention, since the UE does not receive separate measurement settings from an eNB, the eNB may provide in advance information about the cells that can be used for the CSFB service, as system information like in FIG. 11.

FIG. 11 is a flow diagram illustrating a procedure for providing information about cells for a CSFB service as system information by an eNB according to an exemplary embodiment of the present invention.

Referring to FIG. 11, an eNB 1140 periodically broadcasts a System Information Block (SIB) including measurement information for cell selection in the CSFB service, in steps 1101 and 1103. A SIB6 includes information about a 3G (UTRAN) cell, a SIB7 includes information about a 2G (GERAN) cell, and the SIB6 and SIB7 may include measurement information for the multiple cells that a UE 1110 can measure for cell selection in the CSFB service. The measurement information may include at least one of information 'Csfb-preferred' indicating whether each cell is a preferred cell during CSFB operation, and information 'csfbPriority' indicating priority.

For example, the SIB6 transmitted in step 1101 may include at least one of 'Csfb-preferred' and 'csfbpriority' in CarrierFreqUTRA-FDD/TDD IE known in the 3GPP standard. The SIB7 transmitted in step 1103 may include at least one of the Csfb-preferred and csfbpriority in commonInfo IE of CarrierFreqsInfoGERAN IE in the 3GPP standard.

In step 1105, upon receiving the SIB6 or SIB7 transmitted in step 1101 or 1103, the UE 1110 may first measure the cell (or frequency), for which, for example, the flag of csfb-preferred is set as 'yes', or may first measure the cell (or frequency) that has relatively high priority depending on the csfbpriority, when starting the measurements for CSFB.

Although not illustrated, the eNB and MME that provide the CSFB service according to exemplary embodiments of the present invention, which have been described with reference to FIGS. 2 to 11, may be implemented to include a controller for controlling the operations in FIGS. 2 to 11, and a communication interface for transmitting and receiving messages including various information described with reference to FIGS. 2 to 11.

As is apparent from the foregoing description, according to exemplary embodiments of the present invention, if a voice call occurs in a UE that is camping on the LTE system supporting CSFB, the UE may perform the measurements for selecting a 2G/3G cell while performing signaling required for the CSFB process in the LTE system, thereby making it possible to reduce the delay time required until it starts the voice call, thus contributing to a reduction in power consumption of the UE.

In addition, according to exemplary embodiments of the present invention, if a ping-pong phenomenon occurs in which a UE repeats cell selection/reselection between the LTE system and the legacy system in the LTE system supporting CSFB, the UE may be prevented from failing to receive a paging message that is sent from the LTE system due to the use of CSFB.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A terminal for performing circuit switched fallback (CSFB), the terminal comprising:
a transceiver configured to transmit and receive signals; and
a controller coupled to the transceiver and configured to:
transmit, to a base station of a first communication system, a radio resource control (RRC) connection request message including information indicating that measurement on a channel state of a second communication system is being performed,
transmit, to the base station of the first communication system, an RRC connection setup complete message comprising a measurement result on the channel state of the second communication system,
receive, from the base station of the first communication system, a cell list for the CSFB, which is selected based on the measurement result on the channel state, and
connect a voice call over the second communication system, based on the cell list for the CSFB.

2. The terminal of claim 1, wherein the controller is further configured to control an operation of measuring the channel state of the second communication system before performing an RRC connection setup procedure to the first communication system.

3. The terminal of claim 1, wherein the information is delivered to a mobility management entity (MME) through the base station of the first communication system.

4. The terminal of claim 1, wherein the controller is further configured to control an operation of receiving, from the base station of the first communication system, a command to report the measurement result on the channel state for the CSFB, and an operation of transmitting the measurement result to the base station of the first communication system, if the terminal operates in a connected mode.

5. The terminal of claim 1, wherein if the terminal camps on a cell of the second communication system, the controller is further configured to control an operation of receiving, from the base station of the first communication system, a paging message that is transmitted for the CSFB.

6. The terminal of claim 1, wherein the controller is configured to start measuring the channel state, when recognizing that a dial program or a phonebook program for an outgoing call is executed.

7. The terminal of claim 1, wherein the controller is further configured to control an operation of transmitting, to an MME, a non-access stratum (NAS) message including dual reception (RX) configuration information indicating that the terminal has two receivers for the CSFB.

8. The terminal of claim 1, wherein the controller is further configured to receive information about cells that can be used for the CSFB using system information broadcasted by the base station of the first communication system, wherein the information about the cells includes at least one of priority information or flag information indicating a cell that is first measured for the CSFB.

9. A method for performing circuit switched fallback (CSFB) by a terminal in a wireless communication system, the method comprising:
transmitting, to a base station of a first communication system, a radio resource control (RRC) connection request message including information indicating that measurement on a channel state of a second communication system is being performed;
transmitting, to the base station of the first communication system, an RRC connection setup complete message comprising a measurement result on the channel state of the second communication system,
receiving, from the base station of the first communication system, a cell list for the CSFB, which is selected based on the measurement result on the channel state; and
connecting a voice call over the second communication system, based on the cell list for the CSFB.

10. The method of claim 9, further comprising measuring on the channel state of the second communication system before performing an RRC connection setup procedure to the first communication system.

11. The method of claim 9, wherein the information is delivered to a mobility management entity (MME) through the base station of the first communication system.

12. The method of claim 9, further comprising:
receiving, from the base station of the first communication system, a command to report the measurement result on the channel state for the CSFB; and
transmitting the measurement result, to the base station of the first communication system, if a terminal operates in a connected mode.

13. The method of claim 9, further comprising: if the terminal camps on a cell of the second communication system, receiving, from the base station of the first communication system, a paging message that is transmitted for the CSFB.

14. The method of claim 9, wherein measuring the channel state is started when recognizing that a dial program or a phonebook program for an outgoing call is executed.

15. The method of claim 9, further comprising:
   transmitting, to an MME, a non-access stratum (NAS) message including dual reception (RX) configuration information indicating that the terminal has two receivers for the CSFB.

16. The method of claim 9, further comprising receiving information about cells that can be used for the CSFB using system information broadcasted by the base station of the first communication system, wherein the information about the cells includes at least one of priority information or flag information indicating a cell that is first measured for the CSFB.

* * * * *